Dec. 15, 1931. W. A. SMITH 1,836,290
AIR AND GAS WASHING APPARATUS
Filed Nov. 12, 1928
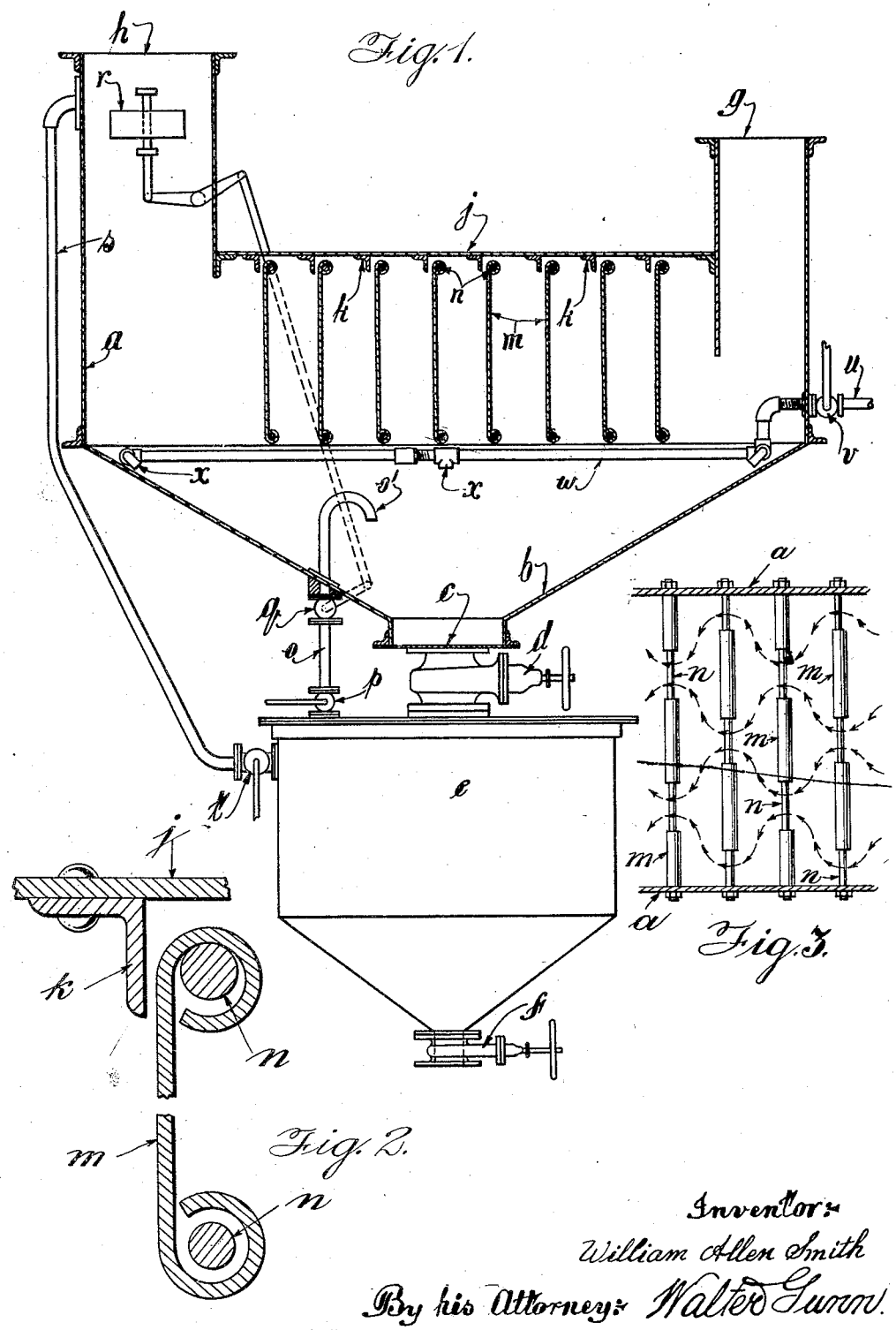
Inventor:
William Allen Smith
By his Attorney: Walter Gunn Patented Dec. 15, 1931

1,836,290

UNITED STATES PATENT OFFICE

WILLIAM ALLEN SMITH, OF MANCHESTER, ENGLAND, ASSIGNOR TO PNEUMATIC CONVEYANCE & EXTRACTION (1929) LIMITED, OF LONDON, ENGLAND, A COMPANY OF GREAT BRITAIN

AIR AND GAS WASHING APPARATUS

Application filed November 12, 1928, Serial No. 318,936, and in Great Britain November 14, 1927.

This invention relates to air and gas washing apparatus.

The object of the invention is to provide an improved and simplified construction of apparatus for the purpose of reducing the cost of manufacture and increasing its efficiency.

According to the invention the improved gas and air washing apparatus comprises a rigid closed tank or vessel containing water or other washing medium through which the air or gas is to be passed for cleansing, an inlet and outlet to the tank for the air or gas and depending baffles arranged in the passage of the air or gas through the vessel to intercept and break up the air in its passage. Further features of the invention consist in supporting the baffles loosely so that they have a limited freedom of movement, and in providing means for maintaining the required level of fluid in the tank and means for clearing the sludge from the tank while the washer is in operation.

Upon the accompanying drawings,

Fig. 1 is a sectional elevation of a preferred example of the invention.

Fig. 2 is an enlarged sectional view of the upper and lower ends of the baffles on their supporting stays, and Fig. 3 is a plan of some of the baffles, showing their arrangement, and the tortuous path for the gas provided by them.

As illustrated the apparatus comprises a closed rectangular tank $a$ having an inclined or funnel-shaped bottom $b$ with an outlet $c$ and valve $d$ for the collection and removal of sludge. Upstanding inlet and outlet connections $g$ and $h$ are arranged at the ends of the tank. The top or cover $j$ of the tank, which is rigid and level and extends between the inlet and outlet connections $g$ and $h$, is provided on its under side with a series of transverse angle pieces $k$, forming baffles, adjacent to each of which is positioned one or more depending vertical baffles $m$, of relatively stiff sheet metal, the upper and lower ends of which are rolled over and engage loosely with upper and lower transverse supporting stays or rods $n$ fixed in the sides of the tank. Preferably the baffles $m$ will be arranged to provide a tortuous path for the air, several baffles being arranged and spaced apart on each of the upper and lower stays to constitute a set and positioned opposite the openings between the baffles of the preceding and succeeding set.

Below the washing tank and connected thereto by the sludge valve, is a sludge receiving tank or hopper $e$, provided at its lower end with sludge outlet valve $f$. From the upper end of such sludge tank is a sludge pipe or siphon $o$ extending upwards into the main tank, the upper end $o^1$ being open and bent over, and positioned near the centre of the main tank and in the sludge collecting portion thereof. This sludge pipe is provided with a hand controlled valve $p$ and an automatically controlled valve $q$ which latter is connected for operation to float mechanism $r$ arranged in the outlet $h$ of the tank. A pressure balance pipe $s$ is provided from the outlet $h$ of the main tank $a$ to the sludge tank $e$ having a controlling valve $t$. Water is supplied to the main tank by a pipe $u$ at the inlet end of the tank leading well down into the tank and provided with a control valve $v$ which may be automatically operated to maintain a predetermined level in the tank. Piping $w$ is arranged around the upper part of the funnel shaped bottom $b$ connected to the valve $v$ and having jets $x$ which may in operation serve to wash down the sludge on the walls thereof.

In operation, the air or gas, laden with solid impurities enters the tank by the inlet and is caused to pass below the water under the baffles $k$ and between the baffles $m$ and by impinging against wet surfaces of the baffles is broken up and caused to deposit the impurities thereon. The angle pieces on the under side of the cover prevents the undue passage of the air above the baffles themselves which by reason of their freedom, are constantly on the move and so shake off as sludge the solid impurities deposited on them, which falls to the bottom of the tank.

As the sludge is deposited during the washing operation the level of the water rises in the tank, and particularly in the outlet thereof, and by operating the float mechanism causes the valve in the sludge pipe to be opened proportionally with the rate of disposition of sludge, or from time to time, so that sludge is drawn off from the tank to maintain the level. Fresh water may if desired be admitted continuously or at definite periods to assist in removal of the sludge and to maintain the freshness of the water during the washing. The automatic control of the valves may be stopped and the apparatus filled and emptied by ordinary control valves, but in either case the removal of sludge may be effected while the apparatus is in use and without interfering with its effective operation. The water inlet is also preferably arranged to provide for flushing and cleansing the bottom and sides of the tank when required. The sludge outlet from the sludge tank may also be automatic and operating with the collection of a predetermined weight of sludge, any suitable type of such valve being used. The overflow pipe will seldom be used as by reason of its location at the top of the tank it will release relatively clean water from the tank whereas it is desirable to retain the water and release only the sludge, and further while the automatic sludge valve is working properly, the water level will never reach so high.

The improved washing apparatus provides a more simple and cheaper construction and in addition enables the removal of sludge automatically or otherwise during the operation of the washer and thereby greatly increases its capacity and efficiency.

What I claim is:—

1. Gas and air washing apparatus comprising a closed vessel with upstanding inlet and outlet, a rigid submerged roof, deep baffles immediately below the roof loosely mounted with their upper ends adjacent to the roof, spaced slightly therefrom to allow movement permitted by their manner of mounting, and disposed so as to provide a tortuous passage, and further shallow baffles rigidly secured to the roof adjacent to the upper ends of the deep baffles so as to check passage of air above the baffles.

2. Gas and air washing apparatus comprising a closed vessel with upstanding inlet and outlet, a rigid submerged roof, deep baffles immediately below the roof loosely mounted with their upper ends adjacent to the roof, spaced slightly therefrom to allow movement permitted by their manner of mounting, and disposed so as to provide a tortuous passage, further shallow baffles rigidly secured to the roof adjacent to the upper ends of the deep baffles so as to check passage of air above the baffles, and means for admitting and maintaining fluid in the vessel up to the required level.

3. Gas and air washing apparatus comprising a closed vessel with upstanding inlet and outlet, a rigid submerged roof, deep baffles immediately below the roof loosely mounted with their upper ends adjacent to the roof, spaced slightly therefrom to allow movement permitted by their manner of mounting, and disposed so as to provide a tortuous passage, further shallow baffles rigidly secured to the roof adjacent to the upper ends of the deep baffles so as to check passage of air above the baffles, means for admitting and maintaining fluid in the vessel up to the required level, and means for automatically discharging the sludge comprising a float controlled outlet valve.

4. Gas and air washing apparatus comprising a closed vessel with upstanding inlet and outlet, a rigid submerged roof, deep baffles immediately below the roof loosely mounted with their upper ends adjacent to the roof, spaced slightly therefrom to allow movement permitted by their manner of mounting, and disposed so as to provide a tortuous passage, further shallow baffles rigidly secured to the roof adjacent to the upper ends of the deep baffles so as to check passage of air above the baffles, means for admitting and maintaining fluid in the vessel up to the required level, means for automatically discharging the sludge comprising a float controlled outlet valve, said means for admitting fluid including piping within the vessel, arranged so as also to provide a spray for washing out the vessel.

5. Gas and air washing apparatus comprising a closed vessel with upstanding inlet and outlet, a rigid submerged roof, with deep baffles immediately below the roof loosely mounted with their upper ends adjacent to the roof, spaced slightly therefrom to allow movement permitted by their manner of mounting, and disposed so as to provide a tortuous passage, further shallow baffles rigidly secured to the roof adjacent to the upper ends of the deep baffles so as to check passage of air above the baffles, means for admitting and maintaining fluid in the vessel up to the required level, a closed sludge receiver below the vessel, a sludge siphon in the vessel delivering to the sludge receiver, a control valve on the siphon, a pressure balancing pipe between the sludge receiver and the vessel, float operated mechanism to operate the control valve of the sludge siphon, said means for admitting fluid including piping within the vessel arranged so as also to provide a spray for washing out the vessel, as set forth.

In testimony whereof I have signed my name to this specification.

WILLIAM ALLEN SMITH.